Dec. 15, 1925.  1,565,846
J. A. CANTEY
BUTTER CUTTER
Filed Nov. 17, 1924   2 Sheets-Sheet 1

Inventor
Joseph A. Cantey
By S. E. Thomas
Attorney

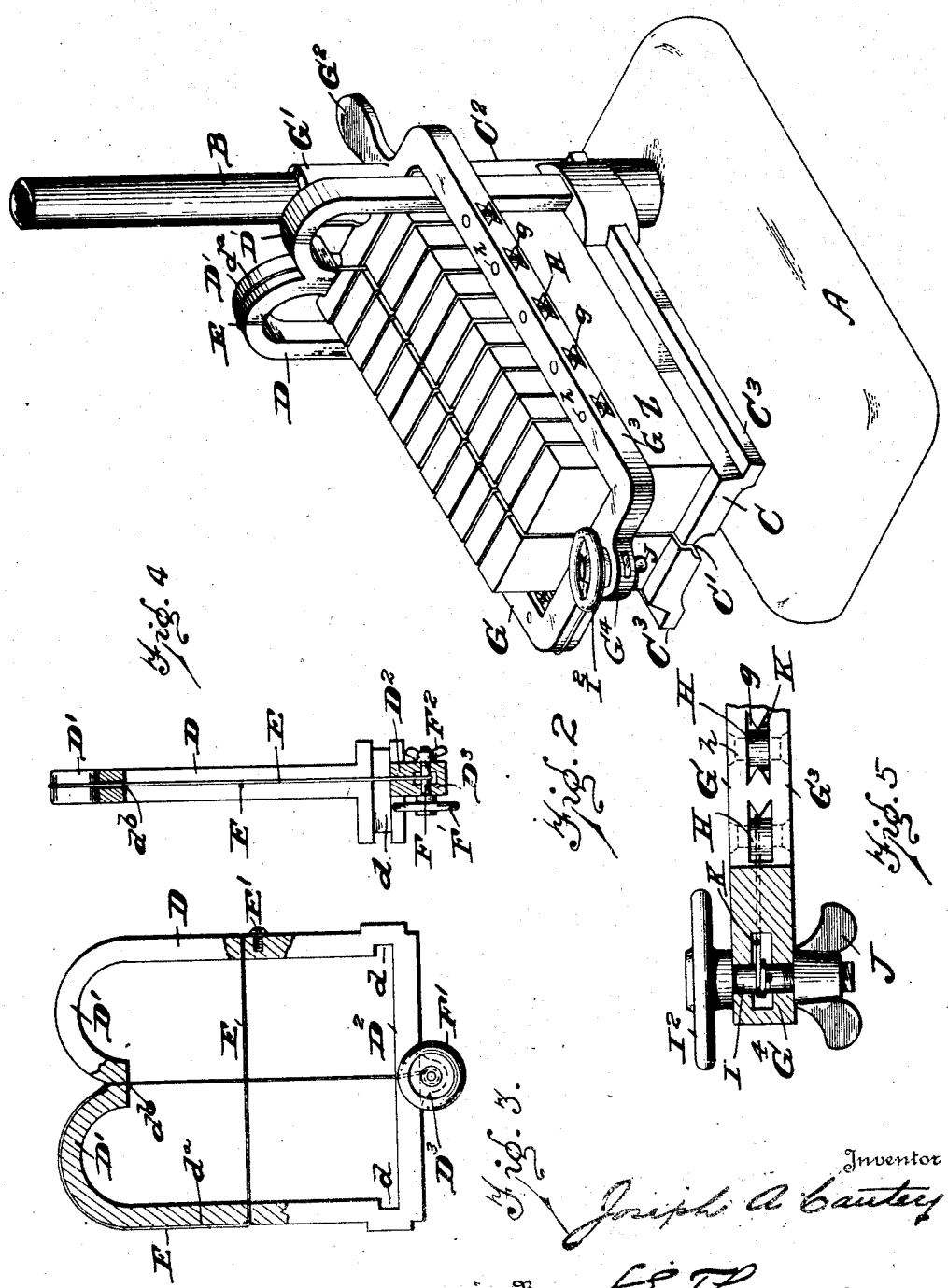

Patented Dec. 15, 1925.

1,565,846

UNITED STATES PATENT OFFICE.

JOSEPH A. CANTEY, OF DETROIT, MICHIGAN.

BUTTER CUTTER.

Application filed November 17, 1924. Serial No. 750,265.

*To all whom it may concern:*

Be it known that I, JOSEPH A. CANTEY, citizen of the United States, residing at Detroit, county of Wayne, State of Michigan, have invented a certain new and useful Improvement in Butter Cutters, and declare the following to be a full, clear, and exact description of the same, such as will enable others skilled in the art to which it pertains to make and use the same, reference being had to the accompanying drawings, which form a part of this specification.

My invention relates to an improvement in butter cutters shown in the accompanying drawings and more particularly described in the following specification and claims.

The primary object of this invention is to provide a simple inexpensive device which is particularly adapted for restaurants, hotels and the like, for cutting butter bricks into a plurality of pieces for serving.

One feature of the invention is to provide means for conveniently supporting the brick provided with a pair of movable cutting frames fitted with wires arranged in spaced relation, with means for maintaining the wires under tension that clean and sharply divided pats of butter may be cut.

A further object of the invention is to provide the cutting frames with a single strand of wire having a plurality of return bends arranged upon the same plane in spaced relation to each other and supported upon rollers journalled in the walls of the frame—to avoid crystallizing the wire—with means for regulating the tension of the strands, whereby each bend or cutting wire may be under like tension and with means for securing the strand of wire when taut, whereby a plurality of butter pats may be cut of regular shape and equal size.

Another feature of the invention is the simple and effective means employed to place the wires under tension and for holding the same when taut.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 2 is a perspective view showing the brick of butter cut by the first named frame and the second frame turned to its initial position and lowered upon the supporting post as when cutting the strips of butter into small pats.

Figure 3 is a front elevation of the frame for cutting the butter brick longitudinally into four strips, with parts in section, also the single strand of wire supported by the frame and the means for placing and maintaining it under tension.

Figure 4 is a vertical central sectional view through the frame indicated in the preceding figure, showing the wire connected with the stub shaft of the tension device.

Figure 5 is an enlarged fragmentary detail and sectional view of the means employed to place the horizontal cutting frame under tension.

Figure 1:
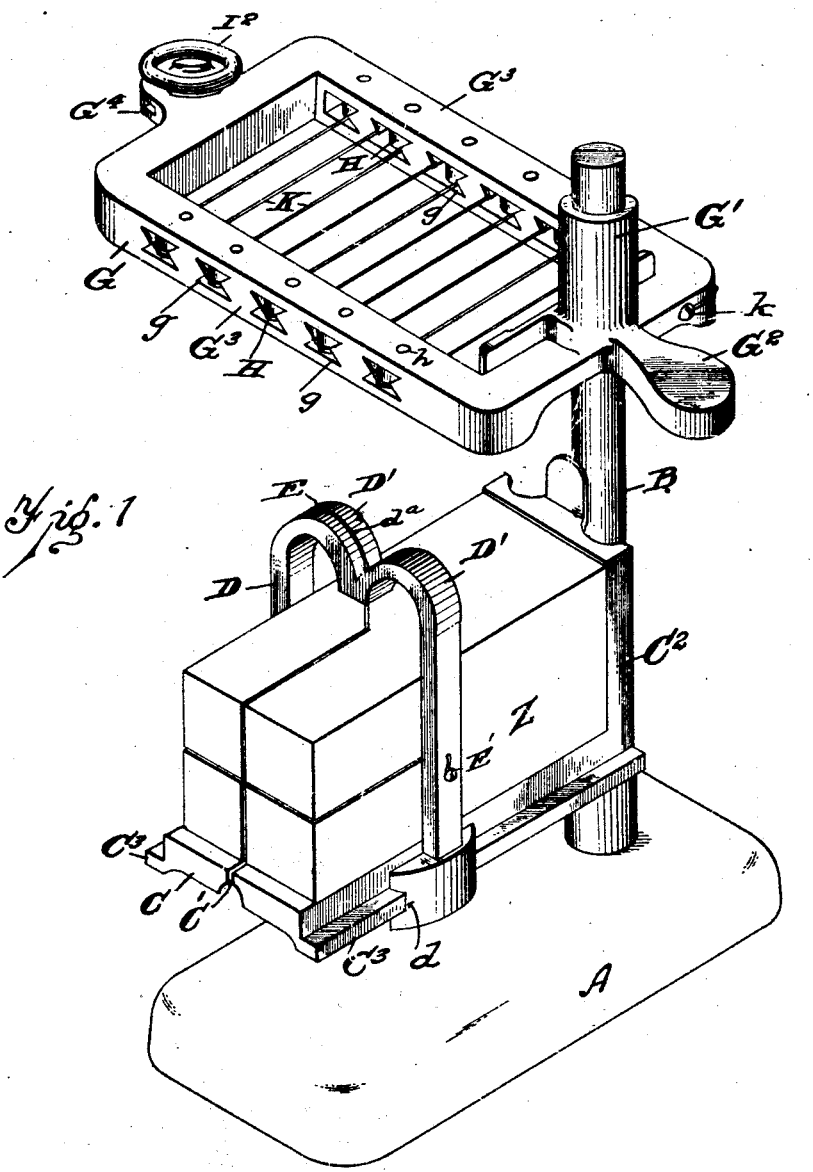
Figure 1 is a perspective view of the device showing a brick of butter resting upon a supporting platform with one of the cutting frames in the act of dividing the brick longitudinally into four strips—the view also shows the other cutting frame raised and turned sidewise in order that the first named frame may readily complete the cut.
Figure 6:
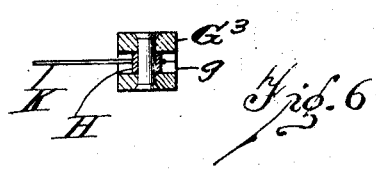
Figure 6 is a detail sectional view through one side of the horizontal frame showing one of the rollers around which the cutting wire is looped.

Referring now to the letters of reference placed upon the drawings:

A denotes a supporting base and B a post rising from one end upon which is mounted a platform C having a central longitudinal slot $C^1$ and an upstanding wall $C^2$ at the end adjacent the post.

Z indicates a brick of butter resting upon the platform with one end abutting the end wall $C^2$ of the platform. $C^3$ designates a flange projecting from each side of the platform to project into the grooves $d$ of a slidable frame D, the upper walls of which form a double arch $D^1$, $D^1$, joined midway between the outer walls of the frame.

E represents a strand of wire secured to one of the side walls of the frame by a screw or other device $E^1$ and bridging the frame D extends upwardly in a groove $d^a$ formed in the outer wall around one arch and thence downwardly through a central aperture $d^b$ in the frame to its lower horizontal wall $D^2$ where it is connected to a stub shaft F journalled in a slotted lug $D^3$ integral with the frame D. The arched portion of the horizontally slidable frame avoids sharp bends in the wire E and permits the wire to slide freely in the tensioning of the said wire E and thereby reduces the friction and prevents breakage of the wire.

$F^1$ denotes a hand wheel secured to the shaft which when rotated brings the wire under tension while a wing nut $F^2$ tapped to receive the end of the shaft serves to secure the wire when made taut against release.

G indicates a horizontal frame having a hub $G^1$ bored to receive the post B, upon which it is adapted to slide and swing horizontally. $G^2$ designates a projecting handle to facilitate its vertical or horizontal movement. The side walls $G^3$ of the frame G are slotted ($g$) at regular spaced intervals to receive a plurality of rollers H loosely mounted upon pins $h$ secured in the wall of the frame. Extending from the end of the frame is a slotted lug $G^4$ in which is journalled a stub shaft I fitted with a hand wheel $I^2$ for rotating the shaft and with a wing-nut J tapped to receive the shaft which when properly adjusted serves to secure said shaft against rotation.

K represents a wire secured at one end by a screw $k$ or like device to the outer wall of the frame and is supported in a groove in the wall of the frame extending to the first slotted opening $g$—the wire then passes around one of the rollers H and thence back and forth around the several rollers, bridging the length of the frame, where it is connected with a stub shaft I, by threading a transverse hole provided therein. The wire is then put under tension by the rotating hand wheel $I^2$ which is afterward secured by the wing-nut J fitted to the end of the shaft.

To provide for readily threading the wire through the frame G the slots are relatively long, their end walls being V or wedge shaped to force the wire toward the middle of the rollers when brought under tension.

Having now indicated the several parts by reference letters the construction and operation of the device will be readily understood.

The frame G is first raised and swung to one side as indicated in Figure 1. The brick of butter may then be placed upon the platform with its end wall bearing against the end wall of the latter. The frame D is then pushed against the outer end of the butter brick forcing its cutting wires through the brick from end to end, thus cutting the brick into four strips. The frame G is then swung over the butter brick and lowered, as shown in Figure 2, cutting the strips into butter pats of equal size. The frame G may then be raised and the butter pats removed from the platform.

Having thus described my invention what I claim is:

1. In a device of the class described having a butter brick supporting platform, the combination of a slidable frame adapted to receive a single continuous strand of wire having a plurality of return bends and bridging the frame, means movably mounted on the frame at the said return bends of the wire and supporting the latter and movable with the wire when the same is stretched, means engaging said strand of wire whereby its return bends may be severally and uniformly brought under tension and means for securing the wire against release when under tension.

2. In a device of the class described, including a butter brick supporting platform, the combination of a vertically slidable frame provided with slots in its side walls, rollers journalled in the slots of the said walls, a single strand of wire secured to one wall of the frame and extending through the slots and having return bends around the respective rollers, the portions of the wire between the bends bridging the frame in spaced relation to each other, a stub shaft journalled in the frame and receiving the free end of the wire and means for securing the stub shaft against release when the wire is brought under tension.

3. In a device of the class described, the combination with a butter brick supporting platform, of a vertically slidable frame having a wire extended back and forth across it, said frame being provided with slots in its side walls through which the wire passes, the end walls of the slots being V-shaped whereby the wire is guided to the middle of the slots, means mounted in the slots of said walls for supporting the wire, and means for tensioning the wire and for securing the same when placed under tension.

4. In a device of the class described including a butter brick supporting platform, the combination of a vertically slidable frame provided with slots in its sides, the end walls of said slots being V-shaped whereby a wire is guided to the middle of the slots, rollers journalled in the slots of said walls, a single strand of wire secured to one wall of the frame and extending through the slots and around the said rollers forming return bends, the portions of the wire between the return bends bridging the frame in spaced relation to each other, a stub shaft journalled at one end of the frame and receiving the free end of the wire and means for securing the stub shaft against release when the wire is brought under tension.

In testimony whereof, I sign this specification.

JOSEPH A. CANTEY.